United States Patent [19]
Park et al.

[11] Patent Number: 5,526,508
[45] Date of Patent: Jun. 11, 1996

[54] CACHE LINE REPLACING SYSTEM FOR SIMULTANEOUSLY STORING DATA INTO READ AND WRITE BUFFERS HAVING MULTIPLEXER WHICH CONTROLS BY COUNTER VALUE FOR BYPASSING READ BUFFER

[75] Inventors: Jee-kyoung Park; Seung-hwe Hwang, both of Seoul, Rep. of Korea

[73] Assignee: Samsung Electronics Co., Ltd., Kyungki-do, Rep. of Korea

[21] Appl. No.: 260,783

[22] Filed: Jun. 16, 1994

[30] Foreign Application Priority Data

Jan. 18, 1994 [KR] Rep. of Korea .......................... 94-879

[51] Int. Cl.⁶ ................................................. G06F 12/00
[52] U.S. Cl. .......................... 395/449; 395/250; 395/445; 395/468; 395/854; 364/243.41; 364/243.43; 364/239.51; 364/DIG. 1; 364/948.3
[58] Field of Search .................................. 395/250, 400, 395/425, 725, 425, 445, 449, 468, 469, 470, 250, 852; 364/DIG. 1, DIG. 2

[56] References Cited

U.S. PATENT DOCUMENTS

| | | | |
|---|---|---|---|
| 4,195,340 | 3/1980 | Joyce | 395/425 |
| 5,025,366 | 6/1991 | Baror | 395/425 |
| 5,043,885 | 8/1991 | Robinson | 395/425 |
| 5,091,846 | 2/1992 | Sachs et al. | 395/250 |
| 5,155,832 | 10/1992 | Hunt | 395/425 |
| 5,206,941 | 4/1993 | Eikill et al. | 395/425 |
| 5,222,223 | 6/1993 | Webb, Jr. et al. | 395/425 |
| 5,249,271 | 9/1993 | Hopkinson et al. | 395/250 |
| 5,261,066 | 11/1993 | Jouppi et al. | 395/425 |
| 5,317,720 | 5/1994 | Stamm et al. | 395/425 |
| 5,345,560 | 9/1994 | Miura et al. | 395/250 |
| 5,355,467 | 10/1994 | MacWilliams et al. | 395/425 |
| 5,377,345 | 12/1994 | Chang et al. | 395/425 |
| 5,404,483 | 4/1995 | Stamm et al. | 395/425 |
| 5,471,598 | 11/1995 | Quattromani et al. | 395/449 |

OTHER PUBLICATIONS

Jouppi, Norman P., "Improving Direct–Mapped Cache Performance by the Addition of a Small Fully–Associative Cache and Prefetch Buffers", IEEE, 1990, pp. 304–373.
Smith, J. E., et al., "Prefetching in Supercomputer Instruction Caches", IEEE, 1992, pp. 588–597.
Brink, James F., "Computer Architecture and VAX Assembly Language Programming", pp. 476–482.

Primary Examiner—Meng-Ai An
Attorney, Agent, or Firm—Leydig, Voit & Mayer

[57] ABSTRACT

A cache line replacing apparatus for use in a computer system having a central processing unit (CPU), a main memory and a cache memory, in which a cache line information of a CPU/cache bus is written-back into the main memory, and desired cache line information is read from the main memory to a memory bus to transmit the read cache line information to the CPU/cache bus, the cache line replacing apparatus including a first storage unit in which write-back data of the CPU/cache bus is stored, a second storage unit in which data which is read from the main memory to the memory bus is stored, a register for increasing a count value thereof when data is stored in the second storage means and decreasing the count value when the data is read from the second storage means, and a multiplexer for selectively transmitting the data stored in the second storage means to the CPU/cache bus or transmitting the data of the memory bus to the CPU/cache bus, according to the count value of the register. Accordingly, the time delay due to the write-back buffering can be avoided and the CPU can read the data without the loss of the memory bandwidth.

7 Claims, 5 Drawing Sheets

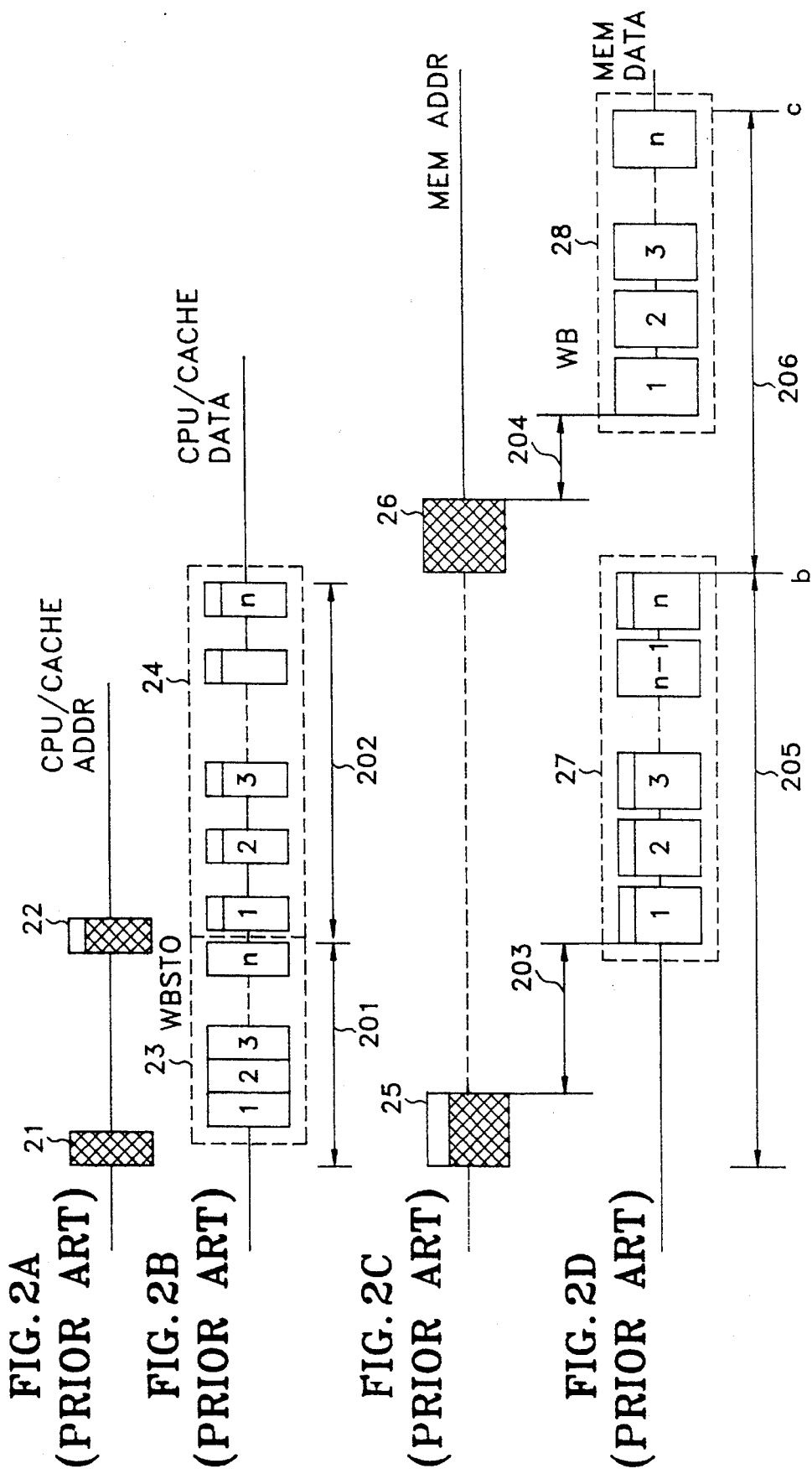

CACHE LINE REPLACING SYSTEM FOR SIMULTANEOUSLY STORING DATA INTO READ AND WRITE BUFFERS HAVING MULTIPLEXER WHICH CONTROLS BY COUNTER VALUE FOR BYPASSING READ BUFFER

BACKGROUND OF THE INVENTION

The present invention relates to a computer system using a cache memory, and more particularly, to an apparatus and method for replacing cache line information by writing back the cache line information into a main memory and reading desired cache line information from the main memory.

A cache memory is used in a computer system for reducing the loss in system performance which occurs when accessing the main memory (usually DRAM) having a relatively low processing speed compared with the processing speed of a central processing unit (CPU) and a bus.

A cache memory is a high-speed buffer which is installed between the main memory and the CPU. The cache memory stores data of the area having a high frequency of use among the contents in a currently used main memory. Since the speed of the cache memory is five to ten times faster than that of the main memory, the effective memory access time can be reduced.

However, when a cache miss is generated because the desired data does not exist in the cache memory, or when sufficient space for storing new data does not exist in the cache memory, an operation cycle for replacing cached data in units of a cache line should be performed.

Such a cache line replacing operation cycle includes a write-back cycle and a read cycle. These write-back and read cycles, which are performed in connection with the main memory, significantly influence system performance.

FIGS. 1A and 1B show timing diagrams of a conventional cache line replacing operation cycle. All the processing procedures during the operation cycle occur in association with the main memory. Accordingly, the total timing of the operation cycle is dependent on the access latency of a DRAM memory which is used as the main memory. FIG. 1A shows addresses of a CPU/cache bus, and FIG. 1B shows data of the CPU/cache bus. In FIGS. 1A and 1B, the time periods designated by reference numerals 101 and 102 represent the access latency periods of the main memory, and the data designated as 1 to n represents the size of a cache line.

During a write-back cycle denoted by 103, data designated at 13 is written back according to a write-back address designated as 11 after the access latency period 101 of the main memory has elapsed, while during a read cycle denoted by 104, data designated at 14 is read according to a read address designated at 12 after the access latency period 102 of the main memory has elapsed.

As a result, the CPU begins the reading of desired data from the point denoted by "a" after performing the write-back cycle and the read cycle which are determined by the access latency of the main memory as shown in FIG. 1B.

To solve the problems associated with the cache line replacing operation cycle and improve the system performance, a high-speed write-back buffer is included in the cache line replacing apparatus. By doing so, when a cache miss occurs, the write-back data is stored in the buffer. This method is called a flagged register write-back (FRWB) method. As an example, a cache controller such as the commercially available Mercury Chipset number 82433LX from Intel Corporation can be used.

FIGS. 2A through 2D show timing diagrams of the cache line replacing cycle according to the conventional FRWB method. FIG. 2A shows addresses of the CPU/cache bus, FIG. 2B shows data of the CPU/cache bus, FIG. 2C shows addresses of the memory bus, and FIG. 2D shows data of the memory bus.

The operation cycle of the CPU/cache bus includes a cycle denoted by 201 during which write-back data designated at 23 is stored in a write-back buffer and another cycle denoted by 202 during which data designated at 27 of the memory bus is transferred to the CPU/cache bus. On the other hand, the operation cycle of the memory bus includes a cycle denoted by 205 during which data designated at 27 is read from the main memory through the memory bus and another cycle denoted by 206 during which data designated at 23 stored in the write-back buffer is written as data designated at 28 into the main memory.

The write-back data 23 is stored in the write-back buffer through the CPU/cache bus during cycle 201. Simultaneously, the main memory is accessed through the memory bus and the data 27 is read therefrom during cycle 205. Read cycle 202 of the CPU/cache bus begins irrespective of the access latency period of the main memory, immediately after the storage of the write-back data 23 has been completed. Accordingly, the CPU begins reading of the desired data from the point designated at "b" as shown in FIG. 2D. Data 23 which is stored in the write-back buffer is written back during cycle 206 from point "b" at which time the read cycle 202 of the CPU/cache bus has ended. Thus, a total operation cycle of the memory bus is completed at the time designated by point "c."

By reducing the time period needed due to the write-back cycle using a buffer rather than accessing the main memory through the CPU/cache bus during the write-back cycle 201, the CPU can more quickly read the desired data.

However, the time period designated at 203 which is needed for storing the data of the CPU/cache bus into the write-back buffer is generally longer than the access latency period of the main memory. Since the larger the size of the cache line, the longer the time required for storing the data, the cycle time cannot not be said to have been sufficiently reduced.

Also, write-back data 23 is stored in the write-back buffer during write-back cycle 201. Then, after read cycle 202 completes at point "c," the data of the write-back buffer is actually written back into the main memory. As a result, the memory bus-occupied time period of cycles 205 and 206 during the cache line replacing cycle increase by the difference between the required buffering time and the access latency period of the main memory, and becomes longer than the total time of cycle 103 plus cycle 104 shown in FIG. 1B.

Thus, since the memory bus has a maximum data transmission limit, since loss of the bandwidth which occupies the memory bus occurs. Particularly, various processors in a multi-processor system commonly occupy a single memory bus, the memory bus bandwidth becomes one of the most important system performance parameters.

SUMMARY OF THE INVENTION

To resolve the above various problems, it is an object of the present invention to provide a cache line replacing apparatus and method, capable of resolving the loss of memory bus bandwidth due to the write-back buffering during a cache line replacing cycle, permitting the CPU to read data as fast as possible.

To accomplish the above object of the present invention, there is provided a computer system configured for high speed cache line replacement having a CPU/cache bus for transmitting cache data, a central processing unit (CPU) coupled to the CPU/cache bus for processing the cache data, and a cache memory coupled to the CPU/cache bus for storing a plurality of lines of the cache data. A first buffer having an input is coupled to the CPU/cache bus for receiving a write-back line of the cache data. The first buffer includes memory for storing the write-back line of the cache data and an output for outputting the write-back line of the cache data. A multiplexer having first and second data inputs, a select input, and a data output is included. The data output of the multiplexer is coupled to the CPU/cache bus. A main memory is included for storing data. A main memory bus couples the output of the first buffer, the second data input of the multiplexer, and the main memory together. A second buffer has an output coupled to the first data input of the multiplexer, an input coupled to the main memory bus, and a memory for storing a new line of cache data from the main memory. Further, there is provided register means for storing a count value, for increasing the count value when data is stored in the second buffer and for decreasing the count value when data is read from the second buffer. The register means has a control output connected to the select input of the multiplexer for configuring the multiplexer to transmit at least a first portion of the new line of cache data stored in the second buffer to the CPU/cache bus when the count value is greater than zero and for configuring the multiplexer to transmit a second portion of the new line of cache data from the memory bus directly to the CPU/cache bus when the count value is zero. This computer system writes the write-back line of the cache data into the first buffer at the same time that at least a portion of the new line of cache data is read from the main memory into the second buffer during a first period. During a second period, the computer system reads the at least a portion of the new line of cache data from the second buffer onto the CPU/cache bus.

The above object according to the present invention can also be accomplished by providing a cache line replacing method for use in a computer system. The cache line replacing method includes storing a write-back line of cache data from a cache, across a CPU/cache bus and into a first buffer while simultaneously storing at least a first portion of a new line of cache data from a main memory across a main memory bus and into a second buffer. Then, the first portion of the new line of cache data from the second buffer is transmitted to the CPU/cache bus. Thereafter, the write-back line of cache data stored in the first buffer is written back into the main memory.

BRIEF DESCRIPTION OF THE DRAWINGS

FIGS. 2A, 2B, 2C and 2D are timing diagrams of another conventional cache line replacing cycle.

DETAILED DESCRIPTION OF THE INVENTION

A preferred embodiment of the present invention will be described below with reference to the accompanying drawings.

Figure 3:
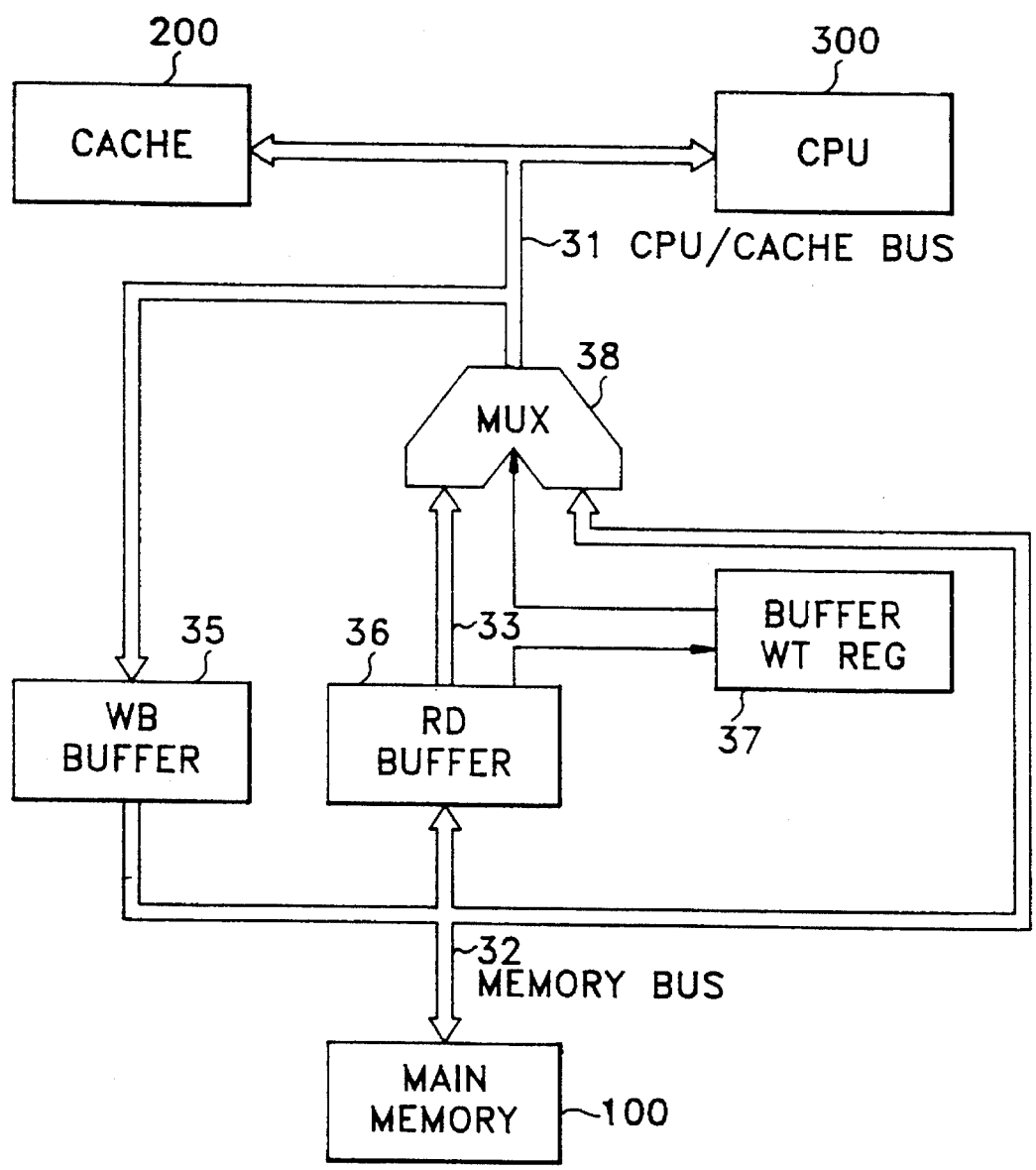
FIG. 3 is a block diagram of a cache line replacing apparatus according to the present invention.

FIG. 3 is a block diagram of a cache line replacing apparatus according to the present invention.

The cache line replacing apparatus includes a write-back buffer 35, a read buffer 36, a buffer count register 37 and a multiplexer 38 between a CPU/cache bus 31 and a memory bus 32. Read buffer 36 is connected between main memory 100 and multiplexer 38 via bus lines 32 and 33. Buffer count register 37 receives an input from read buffer 36 and supplies an output to multiplexer 38. Also, multiplexer 38 and write-back buffer 35 are connected to a cache memory 200 and CPU 300 via bus 31.

Write-back buffer 35 temporarily stores the data of CPU/cache bus 31 to be written back into the main memory 100. After all the cache line information of the main memory is read through CPU/cache bus 31, the temporarily stored data is written back into the main memory. Write-back buffer 35 is employed for avoiding the influence of the access latency of the relatively slow main memory during the write-back cycle. Accordingly, the maximum transmission speed of the CPU/cache bus should be kept in write-back buffer 35.

The data read from the main memory to memory bus 32 is stored in read buffer 36 during the time when the write-back data is stored in write-back buffer 35. Then, immediately after the storage of the write-back data is completed, the data of the read buffer 36 is transmitted to CPU/cache bus 31 through multiplexer 38.

Buffer count register 37 increases its count value when the data is stored into read buffer 36, and decreases the count value when the data is read out from read buffer 36.

Multiplexer 38 adjusts the data path which is transmitted to the CPU/cache bus according to the value of buffer count register 37. That is, multiplexer 38 transmits the data stored in read buffer 36 to CPU/cache bus 31 if the value of register 37 is larger than zero, while multiplexer 38 continuously transmits the data of memory bus 32 to CPU/cache bus 31 when the value of register 37 becomes zero.

The storage capacity of write-back buffer 35 is made to be identical to the size of the cache line information. The storage capacity of read buffer 36 can be varied by the size of the cache line information and the speed difference between the CPU/cache bus and the memory bus. However, the read buffer 36 can be made to have the same capacity as that of the cache line at a maximum, or to have a capacity smaller than that of the cache line. Also, write-back buffer 35 and read buffer 36 operate in a first-in first-out manner.

Figure 4:
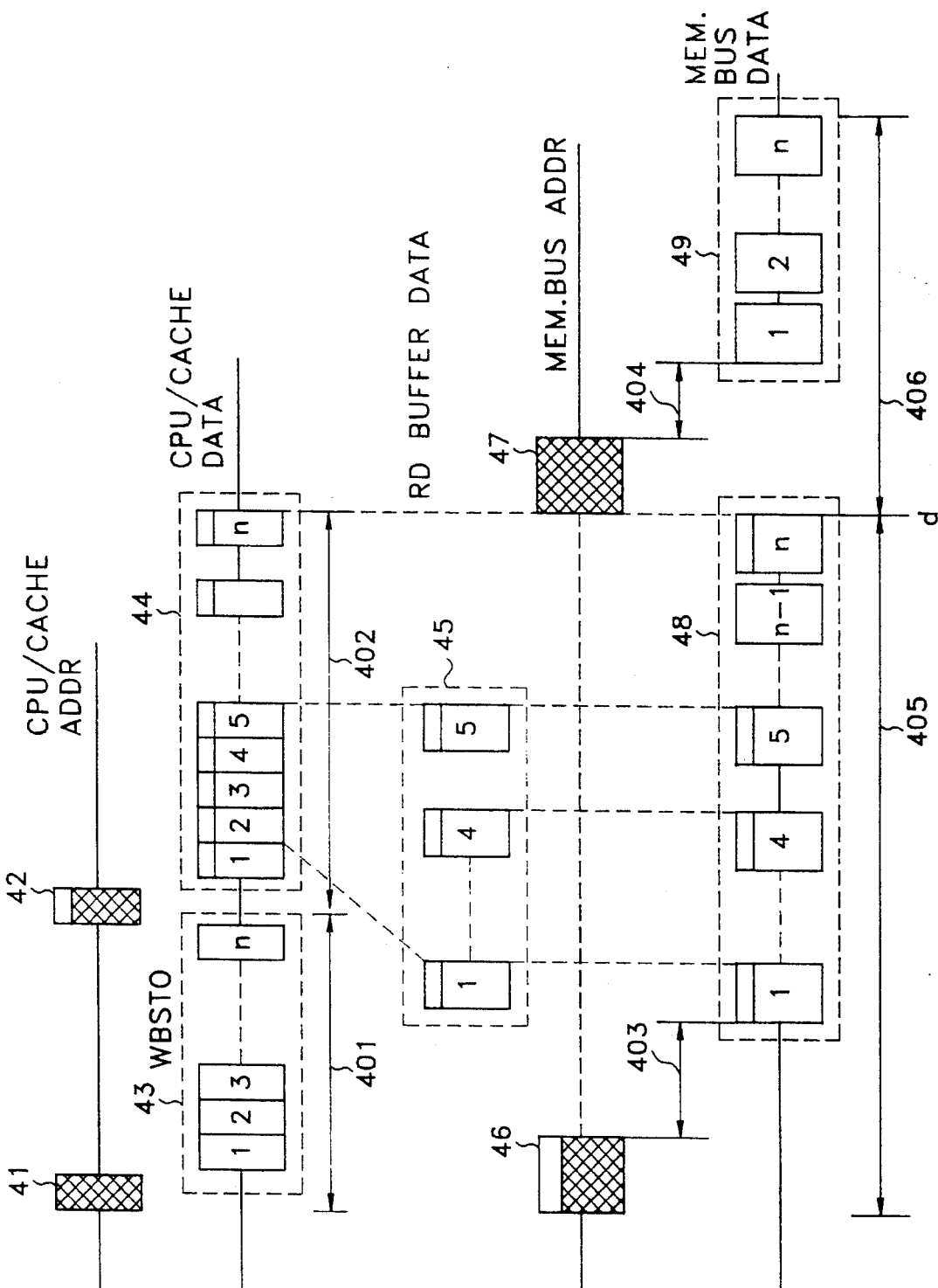
FIGS. 4A, 4B, 4C, 4D and 4E are timing diagrams of the cache line replacing cycle according to the present invention.

FIGS. 4A through 4E illustrate timing diagrams of the operation cycle relating to the cache line replacing apparatus according to the present invention. FIG. 4A shows the addresses of the CPU/cache bus 31, FIG. 4B shows the data of the CPU/cache bus 31, FIG. 4C shows the data of the read buffer 36, FIG. 4D shows the addresses of the memory bus 32, and FIG. 4E shows the data of the memory bus 32.

The operation cycle of CPU/cache bus 31 includes a cycle denoted by reference numeral 401 for storing write-back data 43 in the write-back buffer 35 and another cycle denoted by 402 for transmitting data 48 from the memory bus 32 to the CPU/cache bus 31. The operation cycle of the memory bus 32 includes a cycle denoted by 405 for reading data 48 from the main memory 100 and another cycle denoted by 406 for writing back data 43 stored in the write-back buffer 35 to the main memory.

If a cache line replacing operation is initiated, write-back data 43 is stored in the write-back buffer 35. At the same time, a read operation occurs. The memory bus 32 reads data 48 from the main memory during cycle 405 if the access latency period 403 of the main memory elapses independently of the completion of the storage of the write-back data 43 in the write-back buffer 35, and stores data 45 in turn in the read buffer 36. The buffer count register 37 increases its count value by one each time data is stored into the read buffer 36.

If the storage of the write-back data 43 is completed, data 45 stored in the read buffer 36 is immediately transmitted to the CPU/cache bus 31. The buffer count register 37 decreases its count value by one each time data is read out from read buffer 36.

The read buffer 36 continuously stores the data of the memory bus 32 therein until all of data 45 stored in the read buffer 36 has been read, even during the transmission of the data 45 to the CPU/cache bus 31.

If all of data 45 stored in the read buffer 36 has been read, that is, if the count value of the buffer count register 37 becomes zero, multiplexer 38 switches over to connect the memory bus 32 and data 48 of the memory bus 32 is transmitted directly to the CPU/cache bus 31. In FIGS. 4A through 4E, only the first to fifth parts of data 48 of the memory bus 32 is stored in the read buffer 36 as data 45, and then transmitted to the CPU/cache bus 31 as the first to fifth parts of data 44. All the succeeding parts of data 48 are transmitted directly from the memory bus 32 to the CPU/cache bus 31 as the remaining parts of data 44.

If all of the data 48 of the memory bus 32 has been transmitted to the CPU/cache bus 31 at the time designated by point "d," the CPU reads the data 44. Simultaneously, data 43 stored in the write-back buffer 35 is written back into the main memory during cycle 406.

The timing of the cache line replacing operation cycle according to the present invention as illustrated in FIGS. 4A to 4E will be described below in comparison with the conventional operation cycle described previously.

According to the present invention, the point in time "d" when the CPU reads the data is obtained by adding the cycle 401 for storing the write-back data 43 in the writeback buffer 35 to the cycle 402 for transmitting the data 48 of the memory bus 32 to the CPU/cache bus 31. The point in time "d" coincides with cycle 405 for reading the data from the main memory 100 to the memory bus 32.

On the other hand, data 43 stored in the write-back buffer 35 is written back into the main memory 100 during a predetermined cycle at the point in time "d" when all data is transmitted to the CPU/cache bus. This cycle coincides with write-back cycle 406 of the memory bus 32 depending upon the access latency period 404 of the main memory 100.

Figures 1A, 1B:
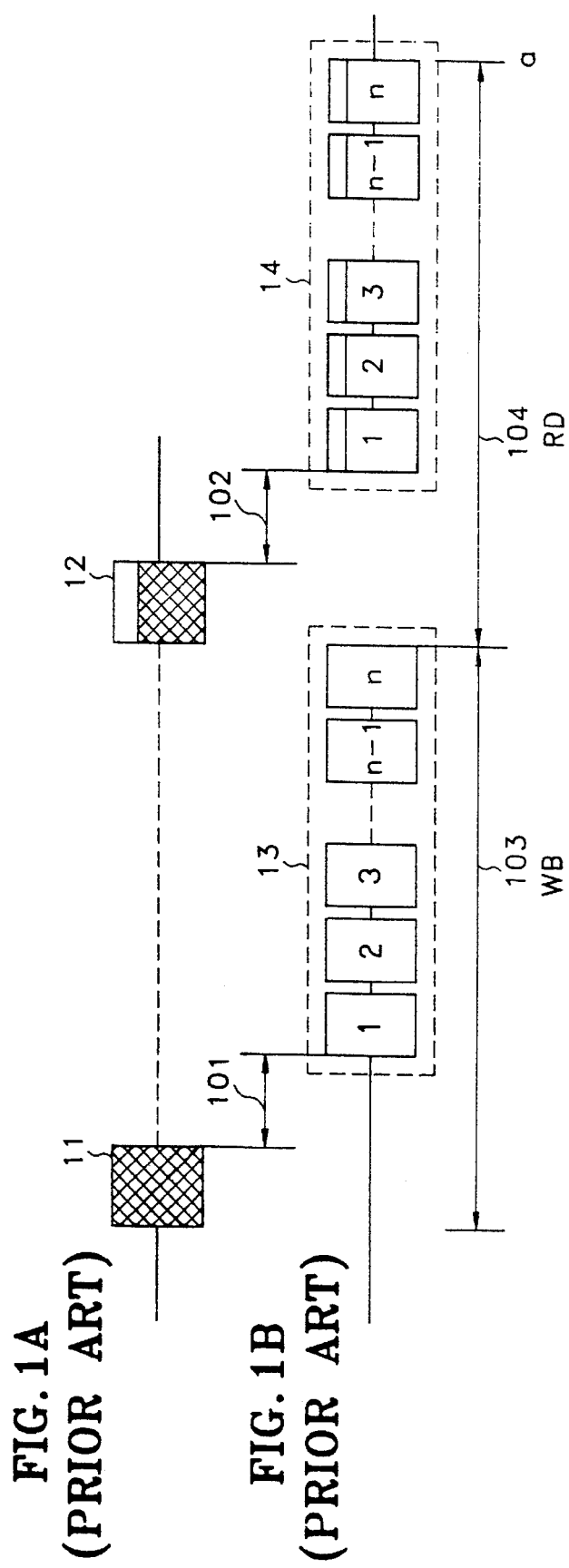
FIGS. 1A and 1B are timing diagrams of a conventional cache line replacing cycle.

Thus, the memory bus bandwidth of cycle 405 plus cycle 406 with respect to the total operation cycle of the memory bus according to the present invention are the same as the memory bus bandwidth of cycle 103 plus cycle 104 of the total operation cycle shown in FIG. 1B. Accordingly, there is no loss of the bandwidth.

Also, in the cache line replacing operation cycle, when a read cycle 405 of the memory bus 32 is completed, the CPU can read the desired data. Accordingly, the point in time when the CPU can read the data can be made to occur earlier at a maximum. Storage cycle 401 of the write-back data 43 starts at the same time as read cycle 405 of the memory bus 32, and ends earlier. Thus, storage cycle 401 of the write-back data 43 does not affect read cycle 405 of the memory bus 32 depending upon the access latency of the main memory.

Figure 5:
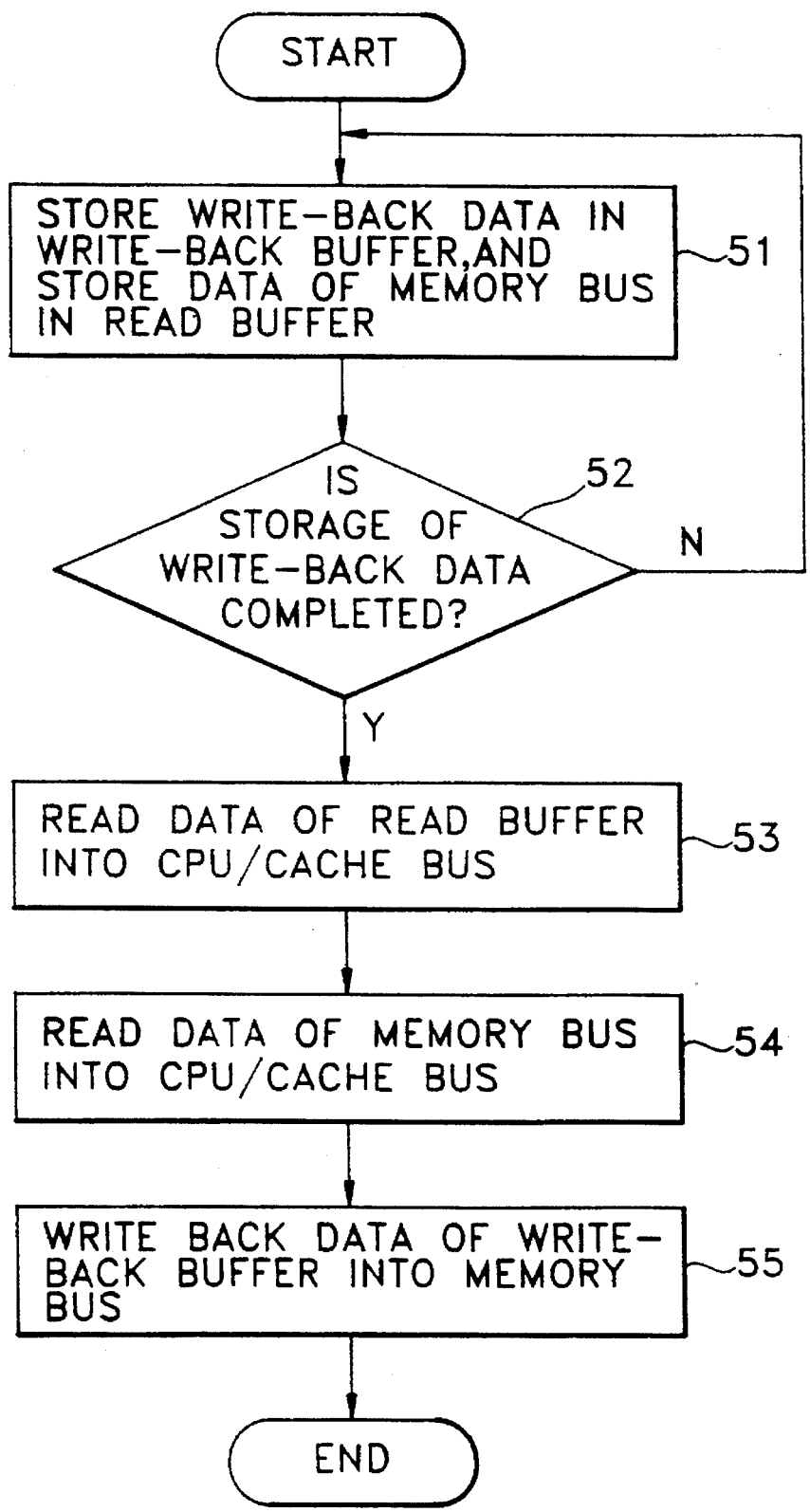
FIG. 5 is a flow-chart diagram for explaining the cache line replacing method according to the present invention.

FIG. 5 is a flow-chart diagram for explaining a cache line replacing method according to the present invention.

In FIG. 5, the write-back data is stored in the write-back buffer, and simultaneously, during the storage of all the write-back data, the data of the memory bus is stored in the read buffer in step 51. If the storage of the write-back data is completed in step 52, the data stored in the read buffer is read through the CPU/cache bus in step 53. Otherwise, storing of the write-back data in the write-back buffer is continued by the operation loop back to step 51. The data of the memory bus is read in step 54 after all the data of the read buffer has been read in step 53. If all the data of the memory bus is transmitted to the CPU/cache bus, the CPU reads the data from the CPU/cache bus. Also, the data stored into the write-back buffer is written back in the main memory in step 55.

As described above, according to the present invention, the write-back data is stored in the write-back buffer during the cache line replacing operation cycle. Simultaneously, the data of the main memory is stored in the read buffer. Therefore, time delay due to the writeback buffering operation can be prevented. Also, without loss of the memory bus bandwidth, the CPU can read the data at high speed.

What is claimed is:

1. A computer system comprising:

a CPU/cache bus for transmitting cache data;

a central processing unit (CPU) coupled to the CPU/cache bus for processing the cache data;

a cache memory coupled to the CPU/cache bus for storing a plurality of lines of the cache data;

a first buffer having an input coupled to the CPU/cache bus for receiving a write-back line of the cache data, a memory for storing the write-back line of the cache data, and an output for outputting the write-back line of the cache data;

a multiplexer having first and second data inputs, a select input, and a data output, the data output being coupled to the CPU/cache bus;

a main memory for storing data;

a main memory bus coupled between the output of the first buffer, the second data input of the multiplexer, and the main memory;

a second buffer having an output coupled to the first data input of the multiplexer and an input coupled to the main memory bus, and a memory for storing a new line of cache data from the main memory; and register means for storing a count value, for increasing the count value when data is stored in the second buffer and for decreasing the count value when data is read from the second buffer, the register means having a control output connected to the select input of the multiplexer for configuring the multiplexer to transmit at least a first portion of the new line of cache data stored in the second buffer to the CPU/cache bus when the count value is greater than zero and for configuring the multiplexer to transmit a second portion of the new line of cache data from the memory bus directly to the CPU/cache bus when the count value is zero, whereby during a first period the write-back line of the cache data is written into the first buffer at the same time that at least a portion of the new line of cache data is read from the main memory into the second buffer, and during a second period the at least a portion of the new line of cache data is read from the second buffer onto the CPU/cache bus.

2. The computer system of claim 1 wherein an access latency period of the first buffer is smaller than an access latency period of the main memory, whereby during a third period the second portion of the new line of cache data is read directly from the main memory bus onto the CPU/cache bus.

3. The computer system of claim 2 wherein the first buffer outputs data at a slower rate than the first buffer inputs data and the second buffer outputs data at a faster rate than the second buffer inputs data.

4. The computer system of claim 3 wherein said first and second buffers both operate in a first-in first-out manner.

5. The computer system of claim 4 wherein the second buffer inputs and output data at the same time.

6. A cache line replacing method for use in a computer system comprising sequentially:

storing a write-back line of cache data from a cache across a CPU/cache bus and into a first buffer while simultaneously storing at least a first portion of a new line of cache data from a main memory across a main memory bus and into a second buffer and increasing a count value from an initial value responsive to data being stored in the second buffer;

configuring a multiplexer to transmit at least a first portion of the new line of cache data from the second buffer to the CPU/cache bus when the count value is greater than the initial value and then transmitting the first portion of the new line of cache data from the second buffer to the CPU/cache bus while decreasing the count value responsive to data being read from the second buffer;

configuring the multiplexer to transmit a second portion of the new line of CPU/cache data from the memory bus directly to the CPU/cache bus when the count value again equals the initial value and then transmitting a second portion of the new line of cache data from the main memory directly to the CPU/cache bus; and writing back the write-back line of cache data stored in the first buffer to the main memory.

7. The cache line replacing method according to claim 6 wherein cache data is continuously transferred from the main memory to the second buffer while cache data from the second buffer is being transferred to the CPU/cache bus.

* * * * *

UNITED STATES PATENT AND TRADEMARK OFFICE
CERTIFICATE OF CORRECTION

PATENT NO. : 5,526,,508
DATED : June 11, 1996
INVENTOR(S) : Park et al.

It is certified that error appears in the above-indentified patent and that said Letters Patent is hereby corrected as shown below:

Column 8, Line 14, after "of" delete --CPU/--

Signed and Sealed this

Seventeenth Day of September, 1996

Attest:

BRUCE LEHMAN

Attesting Officer     Commissioner of Patents and Trademarks